US008032872B2

(12) United States Patent
Violleau et al.

(10) Patent No.: US 8,032,872 B2
(45) Date of Patent: Oct. 4, 2011

(54) SUPPORTING APPLETS ON A HIGH END PLATFORM

(75) Inventors: Thierry P. Violleau, Poissy (FR); Tanjore S. Ravishankar, Los Altos, CA (US); Matthew R. Hill, San Jose, CA (US); Saqib Ahmad, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1179 days.

(21) Appl. No.: 11/641,923

(22) Filed: Dec. 18, 2006

(65) Prior Publication Data

US 2007/0169043 A1 Jul. 19, 2007

Related U.S. Application Data

(60) Provisional application No. 60/757,780, filed on Jan. 9, 2006.

(51) Int. Cl.
*G06F 9/45* (2006.01)
(52) U.S. Cl. ......... 717/149; 717/118; 717/131; 717/139
(58) Field of Classification Search .................. 717/118, 717/136–161
See application file for complete search history.

(56) References Cited

U.S. PATENT DOCUMENTS

| 5,574,846 | A  | * | 11/1996 | Yoshimura et al. | 345/418 |
| 6,260,077 | B1 | * | 7/2001  | Rangarajan et al. | 719/328 |
| 7,080,362 | B2 | * | 7/2006  | Patel et al. | 717/139 |
| 7,127,605 | B1 | * | 10/2006 | Montgomery et al. | 713/150 |
| 7,225,436 | B1 | * | 5/2007  | Patel | 717/139 |
| 7,707,547 | B2 | * | 4/2010  | Colton et al. | 717/118 |
| 2003/0236986 | A1 | * | 12/2003 | Cronce et al. | 713/189 |

FOREIGN PATENT DOCUMENTS

EP 0911732 A2 4/1999

OTHER PUBLICATIONS

Ito, S.A.; Carro, L.; Jacobi, R.P.; Making Java work for microcontroller applications; IEEE, 2002, vol. 18 Issue:5, on pp. 100-110.*
Byrd, G.T.; Holliday, M.A.; Multithreaded processor architectures; IEEE, Aug 1995, vol. 32 Issue:8, on pp. 38-46.*
I Foster, C Kesselman, S Tuecke; The Nexus approach to integrating multithreading and communication; 1996, fetched from http://www.chinagrid.net/grid/paperppt/GlobusPaper/jpdc.pdf; pp. 1-22.*
European search report dated Apr. 21, 2008, corresponding to EPO application No. 07250062.2.
English translation of Office Action in Chinese Patent Application No. 200710000617.3, mailed Apr. 22, 2010, 8 pages.

* cited by examiner

*Primary Examiner* — Wei Zhen
*Assistant Examiner* — Satish Rampuria
(74) *Attorney, Agent, or Firm* — Osha • Liang LLP

(57) ABSTRACT

To execute legacy smart card applications in a next generation smart card environment, a mechanism converts the applications into a format executable by the next generation smart card platforms. For instance, in a Java-based environment, a normalizer tool translates a CAP file into a Java Class file. Additional mechanisms recreate, on next generation smart cards, a specialized environment that allows the legacy applications to execute without impacting legacy and non-legacy application performance. For example, mechanisms create new instances of previously shared objects so that legacy applications can continue to expect exclusive access to those objects. Moreover, mechanisms manage the communication between a legacy application and non-legacy applications by controlling how and when calls are sent to the legacy application.

16 Claims, 5 Drawing Sheets

SUPPORTING APPLETS ON A HIGH END PLATFORM

CROSS-REFERENCES TO OTHER APPLICATIONS

This application claims benefit of Provisional Application Ser. No. 60/757,780, filed Jan. 9, 2006, entitled "Techniques for Supporting Java Card 2.2 Applets on 'High End' Bandol Platform," by Violleau et al., the entire contents of which are incorporated by reference as if fully set forth herein.

This application is related to U.S. patent application Ser. No. 11/591,426 entitled "Class Pre-Loading Mechanism", filed by Violleau et al. on Oct. 31, 2006, the entire contents of which is hereby incorporated by reference for all purposes as if fully set forth herein.

BACKGROUND

Smart cards are cards with embedded circuitry that provide a variety of functionality. Currently, smart cards may be used for credit or debit cards, SIMs for mobile phones, authorization cards for pay television, access-control cards, electronic wallets, public transport payment cards, and for a wide variety of other purposes. One quickly growing use for smart cards is in the area of digital identification. Smart cards are becoming common as tools for verifying and maintaining digital identification information. The reason for the use of smart cards in the area of digital identification is that the cards are engineered to be secure and tamper resistant.

In general, current smart cards are about the size of a credit card (although the card may be bigger or smaller depending on its function). The type and amount of embedded circuitry on a smart card also varies. A typical smart card in use today will include around 512 bytes of volatile storage (e.g., RAM), a slightly greater amount of non-volatile storage (e.g., around 16 kilobytes of EPROM), and a small microprocessor.

Accordingly, software written for current smart cards has to be compact in order to execute in current smart cards' limited computing resource environments. An example of a software framework for developing and executing applications for current smart cards is Sun Microsystem's Java® Card 2.2 technology ("Java Card") (Java® is registered trademarks owned by Sun Microsystems, Inc., Mountain View, Calif.). To make use of the limited resources on current smart cards, Java Card provides an operating framework that includes an abridged version of the standard Java® virtual machine (e.g., the Java Card virtual machine ("JCVM")). The JCVM implements a subset of the standard Java virtual machine instructions.

Because the JCVM does not contain all the standard Java® virtual machine instructions, applications for current smart cards are compacted into a specialized CAP file format. Compressed applets or "CAP" files are traditional Java® class files that have been compressed by translating standard Java virtual machine instructions into a more compact format. This is done by stripping unnecessary information from the Class files from which the CAP files are generated and reducing the number of commands and functions available to be called.

In a Java®-based environment, stripping unnecessary information can include substituting long strings of characters for tokens (e.g., a few characters or a small number representing a longer string). For example, an original Class file may make an external call to the "JavaCard.Framework.Shareable" library. A conversion tool translates that call so that all instances of the external "JavaCard.Framework.Shareable" call are replaced with a token (usually only a single byte in size) that references that particular library. Thus, the original command containing 28 characters (or 28 bytes) is significantly reduced. Accordingly, the size of a CAP file is much smaller than an ordinary Class file. Note that after converting the Class file to CAP format, in order to keep external calls (and names) consistent among multiple applications, the mapping of the call to the token may be stored in a separate file (such as a JCA or EXP file). Then, when other applications are translated, those applications can use the same tokens for specific calls. In this way, only one copy of the external resource with its tokenized name needs to be stored in the smart card environment.

Moreover, since smart cards have limited resources, the smart card's virtual machine generally supports a subset of the instructions a normal virtual machine would support. Accordingly, during the translation process, instructions in a Class format (e.g., Java® byte code) are translated into similar CAP instructions. Often, multiple Class file instructions have to be reduced to a single instruction to perform a similar function. Generally, compacting commands reduces functionality. In many cases, a Class file instruction is simply not supported by a smart card. In those cases, the conversion tool may terminate because it cannot complete a translation, or it may simply ignore the command, throw an exception, prompt the user to change the Class file instruction, enter a corresponding CAP file instruction, or launch a debugging interface. Because of the limited number of commands supported by current smart cards, the size of the applications is considerably reduced.

To further reduce the size of the virtual machine on a smart card, the conversion tool may take additional steps to preprocess a file before converting it into CAP format. Basically, this means that some of the tasks that current Java® virtual machines perform are done prior to converting the file into CAP format. For example, in a standard Java® environment, static variables are typically initialized either when a program is launched or the variable is used. In the Class-to-CAP conversion process, static variables are preinitialized and symbolic references in the Class file are resolved before the file is converted. Moreover, to further reduce the resources required to execute CAP files, Java® Classes are checked to make sure they are properly formed and use only the subset of the Java® programming language that is properly supported by the smart card platform before converting a Class file to CAP format. This preprocessing keeps the Java virtual machine on current smart cards as small as possible by reducing the amount of error-checking and error-handling the smart cards need to perform.

After a Java® Class file has been converted into CAP format, in some cases, additional files, such as a Java® Class Assembly ("JCA") file or export ("EXP") file, may also be created. As mentioned above, these extra files contain public interface information about the Classes in the CAP file and provide information about the fields and methods in each CAP file and any of its associated files.

Once a Class file has been converted into CAP format, the CAP-formatted file ("CAP file") can be downloaded to a current smart card using an on-card installer program and hardware.

Going forward, however, a next generation of smart cards is being developed that provide far greater computing resources than current smart cards. (Note: although the next generation smart cards have far greater computing resources than current smart cards (e.g., "legacy smart cards), the computing resources are still relatively limited when compared to other computing devices (e.g., notebook computers, cell phones, personal computers, etc.)). Because of the greater computing resources, the next generation smart cards can provide a more sophisticated computing environment than the legacy smart cards. As a result, software developers have begun developing more sophisticated software for the next generation smart card.

For example, Sun Microsystem's next generation Java Card technology takes advantage of the next generation smart cards' greater resources by, among other things, creating a virtual machine that can execute Java® Class files. By providing support for Java® Class files, the next generation Java Card virtual machine expands what a smart card can do. For instance, the new virtual machine can implement a much larger set of Java® Class libraries (e.g., Strings), can execute applications in a multi-threaded environment, and can make available many of Java® access control mechanisms. Basically, the next generation Java Card environment provides support for many, if not all, of Java's® traditional features.

Moreover, by providing support for Java® Class files, application development costs for the new smart card platform are reduced since applications can be developed with traditional development tools and ported to the new platform without drastic changes to the application design or code. In this sense, the next generation Java Card platform drastically reduces the need for CAP files.

In fact, as it stands, problems can arise when attempts are made to execute applications in CAP format on a next generation smart card. For example, CAP files have been designed to run as single-threaded applications. As a result, applications on the legacy smart cards have been designed to share common resources (e.g., application data units or certain system files). In next generation smart card environments, sharing a single common resource among multiple applications causes the JCVM to slow down because the JCVM has to perform additional checking to flag the unsafe storing of references. For example, an application may contain a reference to an APDU object that is now in use by a different application. The JCVM performs checks to flag these bad references. Otherwise, an application could use its stored reference to access information in the APDU object even though another application has assumed control of it.

Beyond just runtime performance issues, another problem with supporting CAP files or other legacy applications on next generation smart cards is the development and resource costs of implementing the equivalent of two virtual machines, one to support CAP files and another to support Class files. Although next generation smart cards have more computing resources than legacy smart cards, they generally do not have sufficient resources to implement the two different virtual machines (or the equivalent thereof).

A proposed solution is to simply update legacy applications to be compatible with the next generation smart card. Unfortunately, the cost and time involved in updating and upgrading CAP files and other legacy applications can be quite significant. Software users may not have the time to wait for new software releases, and, even so, they may not be able to afford the updated applications once released. Similarly, software developers may not put a high priority on updating older applications. Hence, it may be months or years (or maybe never) before an application is updated.

Overall, the current solutions for enabling both legacy and non-legacy applications to be executed on a next generation smart card are not satisfactory.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

An approach for executing legacy smart card applications in a next generation smart card framework is described herein. A legacy smart card application generally refers to a single threaded application, which expects to be the only active application at any given time. A next generation smart card framework generally refers to a multi-threaded smart card environment in which multiple applications can be executing concurrently. In the legacy smart card environment, to ensure the safe execution of a legacy smart card application, access to the legacy smart card application by other applications is permitted only through a shareable interface object.

Accordingly, in one embodiment of a next generation smart card framework, a specialized single-threaded environment is created so that a legacy smart card application can execute safely. One aspect of the specialized environment includes a proxy object. The proxy object encapsulates the legacy smart card application's shareable interface object in order to control how other applications access methods, objects, references, functions, and routines within the legacy smart card application. In one embodiment, the proxy object only allows one application to access the shareable interface at a time.

Further, in one embodiment, the specialized environment in the next generation smart card framework creates new copies of objects that in a legacy smart card environment were shared. In one embodiment, the new copies of objects are generated whenever another application requests access to the shared object. In one embodiment, the amount of data used to create the copies is limited to just the object type itself.

Also described herein is an approach for converting a legacy smart card application from a compressed format, such as the CAP file format, into a non-compressed format.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

Figure 1:
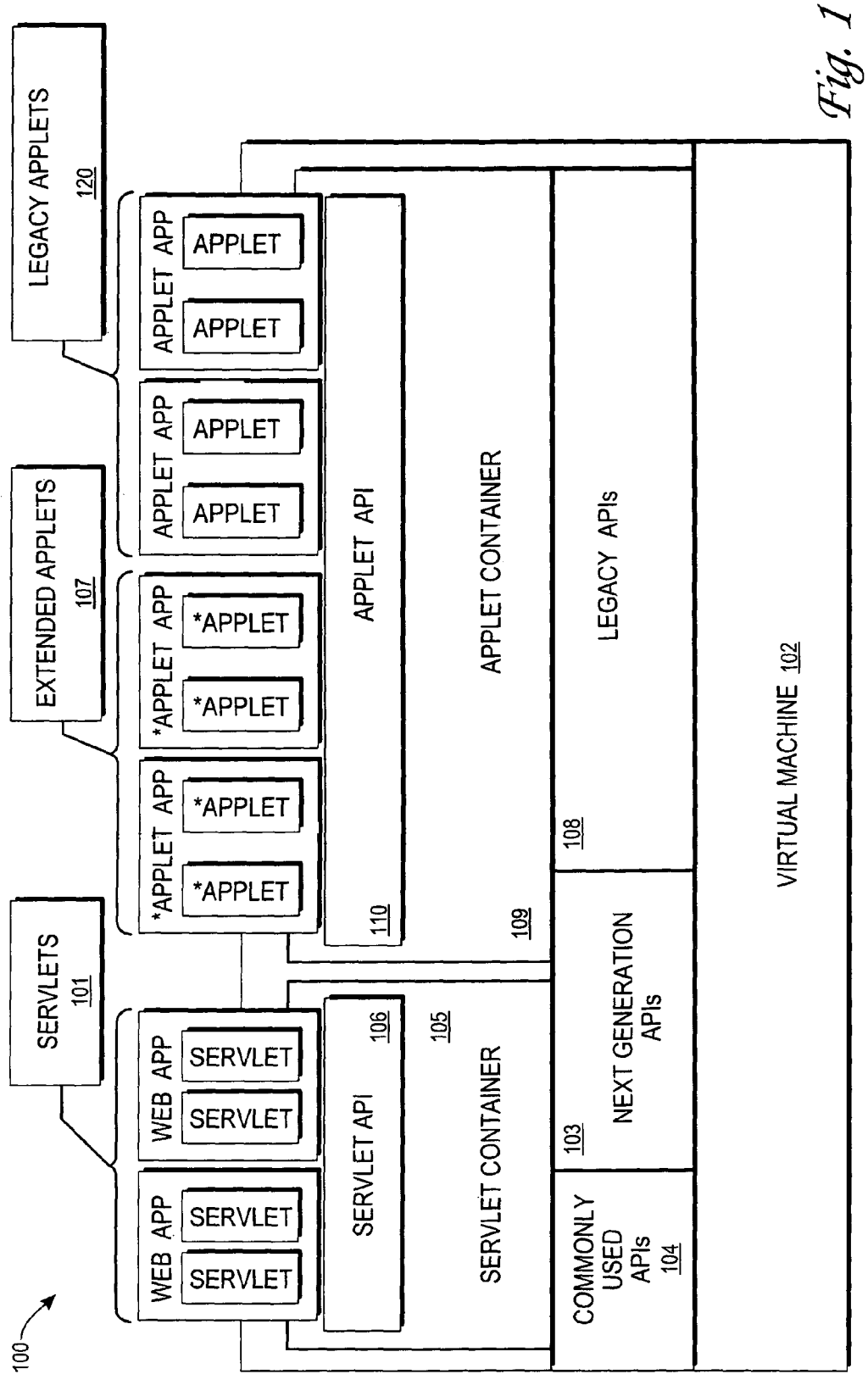
FIG. 1 is a block diagram illustrating a next generation smart card framework, in accordance with an embodiment of the present invention.

Techniques for executing applications developed for legacy smart cards and other low resource environments on next generation smart card platforms are described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are discussed herein for executing legacy smart card applications ("legacy applications") on a next generation smart card. In one embodiment, the techniques include mechanisms for converting the legacy applications into a format executable on next generation smart card platforms. For instance, in a Java®-based next generation smart card environment, a converter mechanism translates a CAP file into a Java® Class file.

The techniques described herein provide further mechanisms that imitate (or recreate), on the next generation smart cards, the specialized environment that legacy applications are designed to execute in. For example, because of limited resources, a legacy smart card often requires legacy applications to share common objects with other alternatively running applications. As a result, those legacy applications were designed with the expectation to have sole access to a given resource until completion of the command processing cycle. The techniques described herein provide mechanisms to create new instances of shared objects so that legacy applications have exclusive access to the previously shared objects.

Moreover, the techniques provide mechanisms to manage the interaction between a legacy application and next generation applications (e.g., by serializing calls to the legacy application). For example, in one embodiment, a proxy mechanism is created to manage the communication between a legacy application and non-legacy applications.

These and other techniques are provided so that legacy applications may co-exist with the more sophisticated applications without significantly impacting both the legacy and non-legacy application's performance. Moreover, the techniques and mechanisms help create a runtime environment on next generation smart cards that is compatible with the one expected by legacy applications. Note that the techniques and mechanisms may be implemented by an application on a smart card, computer, or other computing device, or by a combination of server-based and client-based tools, or by other methods.

The Java Card Environment

The procedures and tools described in this invention are often described in terms of Java® Card 2.x technology ("Java Card") and the next generation Java Card development and runtime environments. These environments are meant only to serve as exemplary environments in which the techniques of the present invention are employed. In alternative implementations, the techniques may be employed in other environments.

I. General Framework for a Next Generation Smart Card

FIG. 1 illustrates an implementation of a framework 100 for next generation smart cards. In one embodiment, framework 100 is a Java®-based software framework, designed to provide a development and runtime environment on next generation smart cards. Framework 100 allows users to leverage current development environments and tools to develop applications that execute on next generation smart cards. Framework 100 also allows software developers to leverage the increased computing resources available on next generation smart cards to provide greater functionality to users. Moreover, in one embodiment, framework 100 provides the necessary mechanisms to create a backwards compatible environment in which legacy applications may execute without significantly impacting performance and execution safety.

Generally, framework 100 provides a runtime environment in which both non-legacy applications, such as servlet-based applications 101 and extended applets 107, and legacy applications, such as legacy applets 120, can execute. Note that non-legacy and legacy applications may be collectively referred to as "applications" herein. The applications executing in framework 100 can perform a wide variety of functions. For instance, they can act as single-sign-on servers providing access to a number of different computing resources with a single user name and password, provide digital rights management services by verifying a user's access rights to digital media, filter spam by passing a user's email through the smart card, and other functions.

FIG. 1 illustrates example components within the framework that provide the functionality and support to execute all types of applications on the virtual machine 102. For example, framework 100 may include a set of next generation smart card APIs ("new APIs") 103, a set of common accessed APIs ("common APIs") 104, a set of legacy APIs ("legacy APIs") 108, a servlet API 106, a servlet container 105, an applet container 109, and an applet API 110. In other embodiments, framework 100 may include a different set of components.

A. Servlet-Based Applications

In FIG. 1, servlet-based applications 101 are example applications that can execute within framework 100. The servlet-based applications 101 include applications that were specifically designed and written for the next generation smart card framework. As such, servlet-based applications 101 typically do not need to be converted from one file format to another to be executable by virtual machine 102. In a next generation Java Card environment, servlet-based applications 101 are Java® Class files.

B. Extended Applets

In addition to servlet-based applications 101, framework 100 may also execute extended applets 107. Extended applets refer to legacy applications that have been rewritten by software developers to take advantage of the new libraries and lower level functionality of the next generation smart card framework 100. Extended applets 107 are not compressed class files or translated versions of compressed class files. In a next generation Java Card environment, an extended applet can be a Java® Class file written to include Java® Class features.

C. Legacy Applets

In FIG. 1, legacy applets 120 generally refer to applications that were designed to run on legacy smart cards and were converted from a more fully-featured version into a compressed format to run on the limited resource environments of legacy smart cards, then translated back into the functional equivalent of the original file. In a next generation Java Card environment, legacy applets 120 include files that were translated into the CAP file format and then translated back into a Java® Class format.

D. Virtual Machine

In framework 100, non-legacy applications and legacy applications are interpreted by virtual machine 102. Virtual machine 102 generally refers to any software interpreter used to interpret applications on a next generation smart card. Depending on implementation, virtual machine 102 may be Java®-based so that virtual machine 102 runs Java® Class files. In other embodiments, virtual machine 102 may execute other types of files.

Virtual machine 102 is designed to run in the resource environment of next generation smart cards. In addition, in one embodiment, virtual machine 102 also creates a runtime environment in which legacy applications can execute. To help create the environment in which legacy applications can execute, virtual machine 102 includes code that transitions the runtime environment from using a single shared copy of an object, to an environment that creates separate objects for each application, thereby, avoiding deadlock and other security issues. Moreover, in one embodiment, virtual machine 102 includes code to generate proxy objects that control access to legacy applications. By doing so, legacy applications can run as single-threaded applications in a multi-threaded environment. In various implementations, these features may be performed by components other than virtual machine 102.

Note that in addition to carving out a single-threaded environment for legacy applications, virtual machine 102 can be further enhanced to improve overall application performance. Basically, virtual machine 102 is designed to improve performance of all applications running on next generation smart cards.

E. Other Building Blocks

FIG. 1 illustrates an example set of other building blocks in framework 100 that may be used in connection with virtual machine 102 to execute applications. Those other building blocks include new APIs 103, common APIs 104, legacy APIs 108, servlet API 106, servlet container 105, applet container 109, and applet API 110. These APIs and containers are referred to herein collectively as "other building blocks". The number of other building blocks in framework 100 varies based on the particular next generation smart card environment, its implementation, its resource constraints, etc.

Each of the other building blocks can be a software module. For example, the other building blocks can be application programming interfaces, dynamic link library files, separate applications, integrated components of virtual machine 102, or some other software tool that defines interfaces between virtual machine 102 and the applications. Moreover, each of the other building blocks may refer to more than one module or software file. For instance, applet container 109 may refer to several files that contain object definitions for objects and methods called by extended applets 107.

The functions provided by the other building blocks generally help reduce the collective amount of resources needed by individual applications by, for example, off-loading code common to a number of applications. For instance, new APIs 103 provide a set of building block routines, protocols, and tools specific to the next generation smart environment that developers can call upon when designing and writing software to run on virtual machine 102. For example, a servlet-based application 101 can be designed to use a new API that provides a common interface for applications running on virtual machine 102. This makes using applications easier for users since the applications will have a similar interface. In a next generation Java Card environment, the new APIs 103 include APIs that provide routines, interfaces, protocols, and functions that are specific to the next generation Java Card virtual machine (e.g., support for Strings).

In one embodiment, like the new APIs, common APIs 104 provide access to applications and virtual machine 102 to commonly requested functions, routines, protocols, and interfaces. For example, if a number of applications commonly call the same function (e.g., a data sort function), that function can be written as a separate helper file and packaged as one the common APIs 104.

Servlet container 105 and servlet API 106, in one embodiment, include additional resources, such as classes, functions, interfaces, and routines that enable servlet-based applications 101 to execute properly. For example, servlet container 105 creates an environment in which non-legacy applications can spawn multiple threads. The applet container 109 and applet API 110 can help provide an environment in which both legacy and non-legacy applications can execute. For example, they can spawn multiple threads so that non-legacy applications can execute at peak performance, and they can also provide an environment in which legacy applications remain thread-safe and execute securely.

The legacy APIs 108 also contain other classes and resources, such as Java Card 2.x APIs, that provide interfaces, functions, and routines so that virtual machine 102 can execute extended and legacy applets. When extended and legacy applications are executing, applet container 109 and applet API 110 may provide additional support and library files so that those applications can execute properly.

In an embodiment, the other building blocks (or a subset thereof), particularly the applet container 109 and applet API 110 can help provide the special runtime environment in which legacy applications execute.

In one embodiment, framework 100 includes a class pre-loading mechanism as described in "Class Pre-Loading Mechanism", filed by Violleau et al. The class pre-loading mechanism isolates legacy application library files and code, such as legacy APIs 106, from multi-threaded applications in the framework. By isolating the library files from multi-threaded applications, much of a legacy application's code becomes inaccessible to non-legacy applications. As a result, a legacy application can run more securely since only legacy applications running in a single-threaded mode can access the code.

II. Legacy Applications in a Next Generation Framework

As mentioned above, servlet-based applications 101 and extended applets 107 are applications that have been designed and updated to run in a next generation smart card framework. Legacy applets 120, on the other hand, are legacy application that were developed to run in legacy smart card environments and that have not yet been updated to run in next generation smart card environments. As a result, legacy applets 120 include applications that are in a compressed file format incompatible with next generation smart card frameworks.

To execute the legacy applications in the next generation smart card framework, in one embodiment, the legacy applications are converted from their compressed format into a format compatible with next generation smart cards. Then the next generation smart card framework, particularly the runtime environment, is adapted to recreate the specialized environment in which the legacy applications were designed to execute in. For example, the next generation smart card framework creates new objects where previously they were shared. In addition, the next generation smart card framework uses proxy objects to control access to legacy applications. In this way, legacy applications can run as single threaded applications in the next generation multi-threaded smart card framework.

These steps may be performed independently of each other or in combination.

A. Legacy Application Normalizer Tool

To be compatible with next generation smart card runtime frameworks, legacy applications generally need to be converted from the format created for the limited resource environments of legacy smart cards into a format compatible with next generation smart cards. For instance, in a next generation Java Card environment, the underlying virtual machine does not directly support CAP files. This is generally a design decision based on the fact that providing direct support for non-legacy and legacy applications would consume too many computing resources. Hence, in one embodiment, the legacy application files are converted into a format compatible with the next generation smart card's virtual machine before the legacy application is executed.

In an embodiment, a normalizer tool translates a compressed Class file into a non-compressed Class file format. The normalizer tool essentially recreates lost information in the legacy application files. For example, in the most basic setting, a user imports a CAP file into a normalizer tool to convert the CAP file into a Class file(s). The normalizer tool then creates a new file and maps each CAP file instruction to a corresponding Class file instruction and places the translated instruction into the new file. Once all the instructions have been translated, the new file is saved as a Class file.

As part of converting the legacy application, it should be noted that the process may be attempting to re-create a file or application that had originally been written in a non-compressed format. In such a case, it may be difficult to generate an exact duplicate of the original file from which a legacy application was generated. Hence, in one embodiment, the normalizer tool converts legacy applications to files that are the functional equivalents of the original files. Basically, normalizer tool generates code that substantially duplicates the function of the original application. For example, in a next generation Java Card environment, a normalizer tool converts a CAP file back into a file executable by the next generation virtual machine and functionally equivalent to the original Java® Class file. Although, in some implementations, the normalizer tool may be able to recreate in its entirety an original, noncompressed file.

It should be noted that there may be some case in which an application was originally written directly as a CAP file. In such a case, the normalizer tool does not attempt to recreate an original file, but instead the tool tries to create a next generation smart card application file that performs substantially the same function as the CAP file performs.

Figure 2:
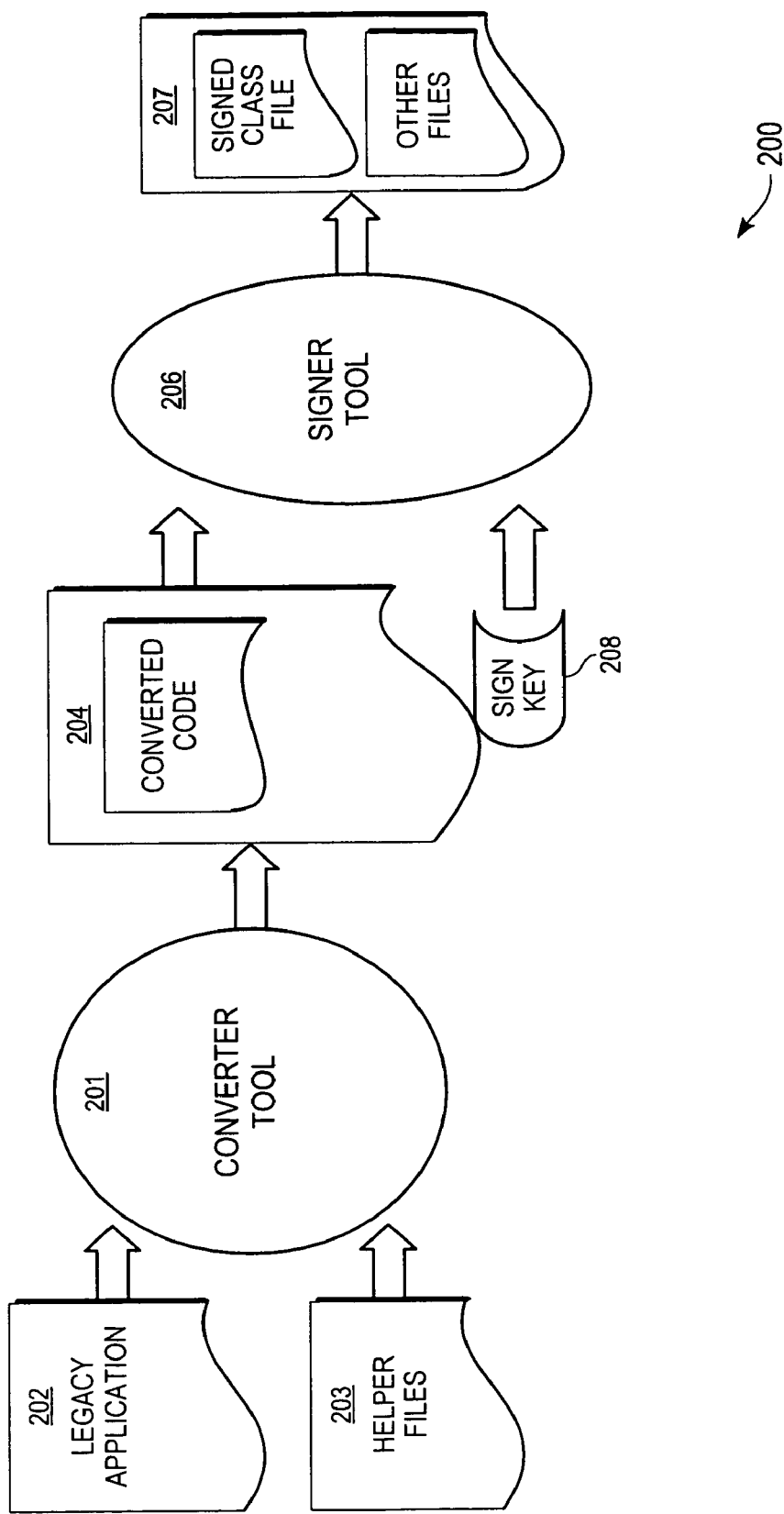
FIG. 2 is a block diagram illustrating a mechanism for converting a legacy application into a next generation smart card application, in accordance with another embodiment of the present invention.

FIG. 2 illustrates a system 200 for converting legacy applications into next generation smart card applications. In one embodiment, system 200 converts CAP files into Class files. In other embodiments, the legacy and non-legacy application files are of different types.

In one embodiment, system 200 for converting legacy application is part of the next generation smart card framework. In this embodiment, the legacy applications are converted at the time the legacy application is launched on the next generation smart card. Alternatively, system 200 is separate from the next generation smart cards. For example, a legacy application can be downloaded from the legacy smart card and passed through an off-card normalizer tool to convert the legacy application into a format interpretable by a next generation smart card.

In one embodiment, system 200 includes normalizer tool 201 that receives as input a legacy application 202 with any associated helper files 203 and outputs "converted code" 204. The converted code 204 generally refers to any non-compressed application format. For example, it can refer to a Class file or some other non-compiled set of instructions, byte code, a non-legacy application, or other symbolic representation of an application performing the functional equivalent of legacy application 202. In one embodiment, converted code 204 is Java® Class byte code.

To illustrate how the normalizer tool 201 works, consider the example of converting a CAP file to a Class file. Typically, a CAP file (along with any associated helper files) include enough information to create Class files that can act as the functional equivalent of the original Class file from which the CAP file was generated. The process for converting a CAP file to a Class file generally includes translating instructions in the CAP file and its component files to a corresponding set of instructions in the Class file.

In a Java®-based environment, normalizer tool 201 takes as input a CAP file and any associated files (e.g., an EXP file that contain information about external classes associated with the CAP application). The instructions contained in the CAP file and its associated files are converted into Java Class instructions and saved as a JAVA® Class file, e.g., converted code.

The process of converting the instructions in a CAP file is performed by the normalizer tool 201. The process includes identifying instructions in the CAP file and performing lookups in an index or table to determine a corresponding set of Class instructions. Below, Table 3 illustrates an example byte code conversion table showing CAP file instructions with their corresponding Java Class byte code instructions. Note that in Table 3, the first three columns of the table relate to CAP file instructions: a number value, the corresponding HEX (or byte) value, and the corresponding text representation of the instruction. The next three columns relate to Java® Class byte code instructions: a number value, the corresponding HEX (or byte code value), and symbolic representations. In some cases, an instruction also includes a brief description of what it does or why it is mapped in a particular way.

TABLE 3

Byte Code Conversion Table

| Java Card Instruction | | | Java Class Byte Code Instruction | | |
|---|---|---|---|---|---|
| 0 | (0x00) | nop | 0 | (0x00) | Nop |
| 1 | (0x01) | aconst_null | 1 | (0x01) | aconst_null |
| 2 | (0x02) | sconst_m1 | 2 | (0x02) | iconst_m1 |
| 3 | (0x03) | sconst_0 | 3 | (0x03) | iconst_0 |
| 4 | (0x04) | sconst_1 | 4 | (0x04) | iconst_1 |
| 5 | (0x05) | sconst_2 | 5 | (0x05) | iconst_2 |
| 6 | (0x06) | sconst_3 | 6 | (0x06) | iconst_3 |
| 7 | (0x07) | sconst_4 | 7 | (0x07) | iconst_4 |
| 8 | (0x08) | sconst_5 | 8 | (0x08) | iconst_5 |
| 9 | (0x09) | iconst_m1 | 2 | (0x02) | iconst_m1 |
| 10 | (0x0A) | iconst_0 | 3 | (0x03) | iconst_0 |
| 11 | (0x0B) | iconst_1 | 4 | (0x04) | iconst_1 |
| 12 | (0x0C) | iconst_2 | 5 | (0x05) | iconst_2 |

TABLE 3-continued

Byte Code Conversion Table

| Java Card Instruction | | | Java Class Byte Code Instruction | | |
|---|---|---|---|---|---|
| 13 | (0x0D) | iconst_3 | 6 | (0x06) | iconst_3 |
| 14 | (0x0E) | iconst_4 | 7 | (0x07) | iconst_4 |
| 15 | (0x0F) | iconst_5 | 8 | (0x08) | iconst_5 |
| 16 | (0x10) | bspush | 16 | (0x10) | Bipush |
| 17 | (0x11) | sspush | 17 | (0x11) | Sipush |
| 18 | (0x12) | bipush | 16 | (0x10) | Bipush |
| 19 | (0x13) | sipush | 17 | (0x11) | Sipush |
| 20 | (0x14) | iipush | 18 | (0x12) | ldc or ldc_w |
| | | | \multicolumn{3}{c}{ldc or ldc_w create an integer constant in the constant pool for the value that is to be pushed on the stack and then depending on the constant pool index for the constant value, use either ldc or ldc_w byte code.} | | |
| 21 | (0x15) | aload | 25 | (0x19) | aload |
| 22 | (0x16) | sload | 21 | (0x15) | iload |
| 23 | (0x17) | iload | 21 | (0x15) | iload |
| 24 | (0x18) | aload_0 | 42 | (0x2a) | aload_0 |
| 25 | (0x19) | aload_1 | 43 | (0x2b) | aload_1 |
| 26 | (0x1A) | aload_2 | 44 | (0x2c) | aload_2 |
| 27 | (0x1B) | aload_3 | 45 | (0x2d) | aload_3 |
| 28 | (0x1C) | sload_0 | 26 | (0x1a) | iload_0 |
| 29 | (0x1D) | sload_1 | 27 | (0x1b) | iload_1 |
| 30 | (0x1E) | sload_2 | 28 | (0x1c) | iload_2 |
| 31 | (0x1F) | sload_3 | 29 | (0x1d) | iload_3 |
| 32 | (0x20) | iload_0 | 26 | (0x1a) | iload_0 |
| 33 | (0x21) | iload_1 | 27 | (0x1b) | iload_1 |
| 34 | (0x22) | iload_2 | 28 | (0x1c) | iload_2 |
| 35 | (0x23) | iload_3 | 29 | (0x1d) | iload_3 |
| 36 | (0x24) | aaload | 50 | (0x32) | aaload |
| 37 | (0x25) | baload | 50 | (0x32) | baload |
| 38 | (0x26) | saload | 51 | (0x33) | saload |
| 39 | (0x27) | iaload | 46 | (0x2e) | iaload |
| 40 | (0x28) | astore | 58 | (0x3a) | astore |
| 41 | (0x29) | sstore | 54 | (0x36) | istore |
| 42 | (0x2A) | istore | 54 | (0x36) | istore |
| 43 | (0x2B) | astore_0 | 75 | (0x4b) | astore_0 |
| 44 | (0x2C) | astore_1 | 76 | (0x4c) | astore_1 |
| 45 | (0x2D) | astore_2 | 77 | (0x4d) | astore_2 |
| 46 | (0x2E) | astore_3 | 78 | (0x4e) | astore_3 |
| 47 | (0x2F) | sstore_0 | 59 | (0x3b) | istore_0 |
| 48 | (0x30) | sstore_1 | 60 | (0x3c) | istore_1 |
| 49 | (0x31) | sstore_2 | 61 | (0x3d) | istore_2 |
| 50 | (0x32) | sstore_3 | 62 | (0x3e) | istore_3 |
| 51 | (0x33) | istore_0 | 59 | (0x3b) | istore_0 |
| 52 | (0x34) | istore_1 | 60 | (0x3c) | istore_1 |
| 53 | (0x35) | istore_2 | 61 | (0x3d) | istore_2 |
| 54 | (0x36) | istore_3 | 62 | (0x3d) | istore_3 |
| 55 | (0x37) | aastore | 83 | (0x53) | aastore |
| 56 | (0x38) | bastore | 84 | (0x54) | bastore |
| 57 | (0x39) | sastore | 86 | (0x56) | sastore |
| 58 | (0x3A) | iastore | 79 | (0x4f) | iastore |
| 59 | (0x3B) | pop | 87 | (0x57) | pop |
| 60 | (0x3C) | pop2 | \multicolumn{3}{c}{Depending on the value on the stack use pop or pop 2 since in Java Card, pop 2 instructions can be used to pop off one integer which should translate to a pop Java instruction.} | | |
| 61 | (0x3D) | dup | 89 | (0x59) | dup |
| 62 | (0x3E) | dup2 | 92 | (0x5c) | dup2 |
| 63 | (0x3F) | dup_x | \multicolumn{3}{c}{Depending on the value for 'mn' use either dup_x1, dup_x2, dup2_x1, or dup2_x2} | | |
| 64 | (0x40) | swap_x | \multicolumn{3}{c}{Use a conversion for the swap_x byte code} | | |
| 65 | (0x41) | sadd | 96 | (0x60) | iadd |
| 66 | (0x42) | iadd | 96 | (0x60) | iadd |
| 67 | (0x43) | ssub | 100 | (0x64) | isub |
| 68 | (0x44) | isub | 100 | (0x64) | isub |
| 69 | (0x45) | smul | 104 | (0x68) | imul |
| 0 | (0x46) | imul | 104 | (0x68) | imul |
| 71 | (0x47) | sdiv | 108 | (0x6c) | idiv |
| 72 | (0x48) | idiv | 108 | (0x6c) | idiv |
| 73 | (0x49) | srem | 112 | (0x70) | irem |
| 74 | (0x4A) | irem | 112 | (0x70) | irem |
| 75 | (0x4B) | sneg | 116 | (0x74) | ineg |
| 76 | (0x4C) | ineg | 116 | (0x74) | ineg |
| 77 | (0x4D) | sshl | 120 | (0x78) | ishl |
| 78 | (0x4E) | ishl | 120 | (0x78) | ishl |
| 79 | (0x4F) | sshr | 122 | (0x7a) | ishr |
| 80 | (0x50) | ishr | 122 | (0x7a) | ishr |

TABLE 3-continued

Byte Code Conversion Table

| Java Card Instruction | | | Java Class Byte Code Instruction | | |
|---|---|---|---|---|---|
| 81 | (0x51) | sushr | 124 | (0x7c) | iushr |
| 82 | (0x52) | iushr | 124 | (0x7c) | iushr |
| 83 | (0x53) | sand | 126 | (0x7e) | iand |
| 84 | (0x54) | iand | 126 | (0x7e) | iand |
| 85 | (0x55) | sor | 128 | (0x80) | ior |
| 86 | (0x56) | ior | 128 | (0x80) | ior |
| 87 | (0x57) | sxor | 130 | (0x82) | ixor |
| 88 | (0x58) | ixor | 130 | (0x82) | ixor |
| 89 | (0x59) | sinc | 132 | (0x84) | iinc |
| 90 | (0x5A) | iinc | 132 | (0x84) | iinc |
| 91 | (0x5B) | s2b | 145 | (0x91) | i2b |
| 92 | (0x5C) | s2i | colspan="3" | Ignore this instruction since the value on the stack is already an integer. | |
| 93 | (0x5D) | i2b | 145 | (0x91) | i2b |
| 94 | (0x5E) | i2s | 147 | (0x93) | i2s |
| 95 | (0x5F) | icmp | colspan="3" | Icmp instruction is followed by a "compare with 0" instruction. Read the instruction following icmp and replace icmp instruction according to the following table: | |

| | Java Card Instruction | | | Java Instruction | |
|---|---|---|---|---|---|
| 96 | (0x60) | ifeq | 159 | (0x9f) | if_icmpeq |
| 152 | (0x98) | ifeq_w | | | |
| 97 | (0x61) | ifne | 160 | (0xa0) | if_icmpne |
| 153 | (0x99) | ifne_w | | | |
| 98 | (0x62) | iflt | 161 | (0xa1) | if_icmplt |
| 154 | (0x9a) | iflt_w | | | |
| 99 | (0x63) | ifge | 162 | (0xa2) | if_icmpge |
| 155 | (0x9b) | ifge_w | | | |
| 100 | (0x64) | ifgt | 163 | (0xa3) | if_icmpgt |
| 156 | (0x9c) | ifgt_w | | | |
| 101 | (0x65) | ifle | 164 | (0xa4) | if_icmple |
| 157 | (0x9d) | ifle_w | | | |

| Java Card Instruction | | | Java Class Byte Code Instruction | | |
|---|---|---|---|---|---|
| 96 | (0x60) | ifeq | 153 | (0x99) | ifeq |
| 97 | (0x61) | ifne | 154 | (0x9a) | ifne |
| 98 | (0x62) | iflt | 155 | (0x9b) | iflt |
| 99 | (0x63) | ifge | 156 | (0x9c) | ifge |
| 100 | (0x64) | ifgt | 157 | (0x9d) | ifgt |
| 101 | (0x65) | ifle | 158 | (0x9e) | ifle |
| 102 | (0x66) | ifnull | 198 | (0xc6) | ifnull |
| 103 | (0x67) | ifnonnull | 199 | (0xc7) | ifnonnull |
| 104 | (0x68) | if_acmpeq | 165 | (0xa5) | if_acmpeq |
| 105 | (0x69) | if_acmpne | 166 | (0xa6) | if_acmpne |
| 106 | (0x6A) | if_scmpeq | 159 | (0x9f) | if_icmpeq |
| 107 | (0x6B) | if_scmpne | 160 | (0xa0) | if_icmpne |
| 108 | (0x6C) | if_scmplt | 161 | (0xa1) | if_icmplt |
| 109 | (0x6D) | if_scmpge | 162 | (0xa2) | if_icmpge |
| 110 | (0x6E) | if_scmpgt | 163 | (0xa3) | if_icmpgt |
| 111 | (0x6F) | if_scmple | 164 | (0xa4) | if_icmple |
| 112 | (0x70) | goto | 167 | (0xa7) | goto |
| 113 | (0x71) | jsr | 168 | (0xa8) | jsr |
| 114 | (0x72) | ret | 169 | (0xa9) | ret |
| 115 | (0x73) | stableswitch | 170 | (0xaa) | tableswitch |
| 116 | (0x74) | itableswitch | 170 | (0xaa) | tableswitch |
| 117 | (0x75) | slookupswitch | 171 | (0xab) | lookupswitch |
| 118 | (0x76) | ilookupswitch | 171 | (0xab) | lookupswitch |
| 119 | (0x77) | areturn | 176 | (0xb0) | areturn |
| 120 | (0x78) | sreturn | 172 | (0xac) | ireturn |
| 121 | (0x79) | ireturn | 172 | (0xac) | ireturn |
| 122 | (0x7A) | return | 177 | (0xb1) | return |
| 123 | (0x7B) | getstatic_a | 178 | (0xb2) | getstatic (change the index to be the index in the class constant pool corresponding to the field from where the value is loaded) |
| 124 | (0x7C) | getstatic_b | 178 | (0xb2) | getstatic (change the index to be the index in the class constant pool corresponding to the field from where the value is loaded) |
| 125 | (0x7D) | getstatic_s | 178 | (0xb2) | getstatic (change the index to be the index in the class constant pool corresponding to the field from where the value is loaded) |
| 126 | (0x7E) | getstatic_i | 178 | (0xb2) | getstatic (change the index to be the index in the class constant pool corresponding to the field from where the value is loaded) |

TABLE 3-continued

Byte Code Conversion Table

| Java Card Instruction | | | Java Class Byte Code Instruction | | |
|---|---|---|---|---|---|
| 127 | (0x7F) | putstatic_a | 179 | (0xb3) | putstatic (change the index to be the index in the class constant pool corresponding to the field from where the value is stored) |
| 128 | (0x80) | putstatic_b | 179 | (0xb3) | putstatic (change the index to be the index in the class constant pool corresponding to the field from where the value is stored) |
| 129 | (0x81) | putstatic_s | 179 | (0xb3) | putstatic (change the index to be the index in the class constant pool corresponding to the field from where the value is stored) |
| 130 | (0x82) | putstatic_i | 179 | (0xb3) | putstatic (change the index to be the index in the class constant pool corresponding to the field from where the value is stored) |
| 131 | (0x83) | getfield_a | 180 | (0xb4) | getfield (change the index to be the index in the class constant pool corresponding to the field from where the value is loaded) |
| 132 | (0x84) | getfield_b | 180 | (0xb4) | getfield (change the index to be the index in the class constant pool corresponding to the field from where the value is loaded) |
| 133 | (0x85) | getfield_s | 180 | (0xb4) | getfield (change the index to be the index in the class constant pool corresponding to the field from where the value is loaded) |
| 134 | (0x86) | getfield_i | 180 | (0xb4) | getfield (change the index to be the index in the class constant pool corresponding to the field from where the value is loaded) |
| 135 | (0x87) | putfield_a | 181 | (0xb5) | putfield (change the index to be the index in the class constant pool corresponding to the field from where the value is stored) |
| 136 | (0x88) | putfield_b | 181 | (0xb5) | putfield (change the index to be the index in the class constant pool corresponding to the field from where the value is stored) |
| 137 | (0x89) | putfield_s | 181 | (0xb5) | putfield (change the index to be the index in the class constant pool corresponding to the field from where the value is stored) |
| 138 | (0x8A) | putfield_i | 181 | (0xb5) | putfield (change the index to be the index in the class constant pool corresponding to the field from where the value is stored) |
| 139 | (0x8B) | invokevirtual | 182 | (0xb6) | invokevirtual (calculate the class constant pool index for the method that is to be invoked) |
| 140 | (0x8C) | invokespecial | 183 | (0xb7) | invokespecial (calculate the class constant pool index for the method that is to be invoked) |
| 141 | (0x8D) | invokestatic | 184 | (0xb8) | invokestatic (calculate the class constant pool index for the method that is to be invoked) |
| 142 | (0x8E) | invokeinterface | 185 | (0xb9) | invokeinterface (calculate the class constant pool index for the method that is to be invoked, change the token to 0 and count is basically nargs) |
| 143 | (0x8F) | new | 187 | (0xbb) | new (index must be resolved to a valid entry in the class constant pool) |
| 144 | (0x90) | newarray | 188 | (0xbc) | newarray (resolve the "atype" property) |
| 145 | (0x91) | anewarray | 189 | (0xbd) | anewarray (calculate the index in the class constant pool for the reference for which the new array is to be created.) |
| 146 | (0x92) | arraylength | 190 | (0xbe) | arraylength |
| 147 | (0x93) | athrow | 191 | (0xbf) | athrow |
| 148 | (0x94) | checkcast | 192 | (0xc0) | checkcast (change the format of the command to use index in the constant pool) |
| 149 | (0x95) | instanceof | 193 | (0xc1) | instanceof (change the format of the command to use index in the constant pool) |
| 150 | (0x96) | sinc_w | 132 | (0x84) | iinc |

TABLE 3-continued

Byte Code Conversion Table

| Java Card Instruction | | | Java Class Byte Code Instruction | | |
|---|---|---|---|---|---|
| 151 | (0x97) | iinc_w | | | Use a conversion for the iinc_w byte code |
| 152 | (0x98) | ifeq_w | 153 | (0x99) | ifeq |
| 153 | (0x99) | ifne_w | 154 | (0x9a) | ifne |
| 154 | (0x9A) | iflt_w | 155 | (0x9b) | iflt |
| 155 | (0x9B) | ifge_w | 156 | (0x9c) | ifge |
| 156 | (0x9C) | ifgt_w | 157 | (0x9d) | ifgt |
| 157 | (0x9D) | ifle_w | 158 | (0x9e) | ifle |
| 158 | (0x9E) | ifnull_w | 198 | (0xc6) | ifnull |
| 159 | (0x9F) | ifnonnull_w | 199 | (0xc7) | ifnonnull |
| 160 | (0xA0) | if_acmpeq_w | 165 | (0xa5) | if_acmpeq |
| 161 | (0xA1) | if_acmpne_w | 166 | (0xa6) | if_acmpne |
| 162 | (0xA2) | if_scmpeq_w | 159 | (0x9f) | if_icmpeq |
| 163 | (0xA3) | if_scmpne_w | 160 | (0xa0) | if_icmpne |
| 164 | (0xA4) | if_scmplt_w | 161 | (0xa1) | if_icmplt |
| 165 | (0xA5) | if_scmpge_w | 162 | (0xa2) | if_icmpge |
| 166 | (0xA6) | if_scmpgt_w | 163 | (0xa3) | if_icmpgt |
| 167 | (0xA7) | if_scmple_w | 164 | (0xa4) | if_icmple |
| 168 | (0xA8) | goto_w | 167 | (0xa7) | goto |
| 169 | (0xA9) | getfield_a_w | 180 | (0xb4) | getfield (change the index to be the index in the class constant pool) |
| 170 | (0xAA) | getfield_b_w | 180 | (0xb4) | getfield (change the index to be the index in the class constant pool) |
| 171 | (0xAB) | getfield_s_w | 180 | (0xb4) | getfield (change the index to be the index in the class constant pool) |
| 172 | (0xAC) | getfield_i_w | 180 | (0xb4) | getfield (change the index to be the index in the class constant pool) |
| 173 | (0xAD) | getfield_a_this | 42 | (0x2a) | aload_0 (to load reference to current object on the stack) followed by 180 (0xb4) getfield (change the index to be the index in the class constant pool) |
| 174 | (0xAE) | getfield_b_this | 42 | (0x2a) | aload_0 (to load reference to current object on the stack) followed by 180 (0xb4) getfield (change the index to be the index in the class constant pool) |
| 175 | (0xAF) | getfield_s_this | 42 | (0x2a) | aload_0 (to load reference to current object on the stack) followed by 180 (0xb4) getfield (change the index to be the index in the class constant pool) |
| 176 | (0xB0) | getfield_i_this | 42 | (0x2a) | aload_0 (to load reference to current object on the stack) followed by 180 (0xb4) getfield (change the index to be the index in the class constant pool) |
| 177 | (0xB1) | putfield_a_w | 181 | (0xb5) | putfield (change the index to be the index in the class constant pool) |
| 178 | (0xB2) | putfield_b_w | 181 | (0xb5) | putfield (change the index to be the index in the class constant pool) |
| 179 | (0xB3) | putfield_s_w | 181 | (0xb5) | putfield (change the index to be the index in the class constant pool) |
| 180 | (0xB4) | putfield_i_w | 42 | (0x2a) | aload_0 (to load reference to current object on the stack) followed by 181 (0xb5) putfield (change the index to be the index in the class constant pool) |
| 181 | (0xB5) | putfield_a_this | 42 | (0x2a) | aload_0 (to load reference to current object on the stack) followed by 181 (0xb5) putfield (change the index to be the index in the class constant pool) |
| 182 | (0xB6) | putfield_b_this | 42 | (0x2a) | aload_0 (to load reference to current object on the stack) followed by 181 (0xb5) putfield (change the index to be the index in the class constant pool) |
| 183 | (0xB7) | putfield_s_this | 42 | (0x2a) | aload_0 (to load reference to current object on the stack) followed by 181 (0xb5) putfield (change the index to be the index in the class constant pool) |
| 184 | (0xB8) | putfield_i_this | 42 | (0x2a) | aload_0 (to load reference to current object on the stack) followed by 181 (0xb5) putfield (change the index to be the index in the class constant pool) |

To convert the CAP file into a Class file, the normalizer tool 201 iterates over the entire CAP file mapping each CAP instruction to its corresponding Class instruction. For example, using Table 3 as a guide, suppose the normalizer tool 201 encounters the CAP file instruction (0×70). The normalizer tool performs a table look-up to find the corresponding Java Class instruction (0×A7) and replaces the CAP instruction with the Java Class instruction in converted code 204.

During the conversion process, the normalizer tool 201 may also consult the additional helper files. For example, if the CAP file includes an instruction to an external function or routine that has its mapping stored in an EXP file, the normalizer tool consults the EXP file for the appropriate call mapping. In the end, normalizer tool 201 generates converted code 204 that performs the functional equivalent of the CAP file. In this example, the resulting converted code is Java® Class byte code.

As noted above, normalizer tool 201 attempts to create a file that performs the functional equivalent of the original application. Generally, the differences between the converted code 204 created by normalizer tool 201 and an original Class file should be few. Some of the more common differences can include the following:

1) The names of non-public and non-shareable classes in an applet package may be different. This can occur when converting Classes to CAP format, the name of a Class file is typically converted to a token or numerical representation. Then, when the CAP file is converted back, the Class name is converted into something different. For example, if a Class file is originally entitled Person and then converted to CAP format. In CAP format, the Person Class may now be a numeric token (e.g., 12). During that translation, the actual title for the Person Class is lost because to a computer names mean nothing. Thus when the CAP file is translated back, normalizer tool 201 may have to automatically generate a new title for the Person Class, e.g., "Class 1". Note that although the name has changed the underlying function should remain the same.

(2) For similar reasons, the names of non-public methods and fields may be different from what they were originally named.

(3) The names of public fields and methods in an applet package that are not inherited from a class in another package may also vary.

(4) Finally, the source file attribute for the class file (e.g., the attribute that defines the source and destination directories for a class) may be different from the original.

Although, these are the four most common differences, it should be noted that in some instances, certain attributes associated with a Class file may also be difficult to reproduce. For instance, some methods in a Class have an optional exceptions attribute that may not be recreatable by the normalizer tool. Similarly, the line number and local variable table attributes may also differ after a CAP file has been reverse converted. Finally, converted code 204 may be different from the byte codes in the original class files due to optimizations that take place on the byte code before converting a Class file to a CAP file.

Once a legacy application has been converted into converted code 204, in one embodiment, signer tool 206 signs the converted code 204 with a private key 208, so that other applications and users may verify the integrity of the Classes 207 provided.

B. Procedure for Converting Cap to a Class File

Figure 3:
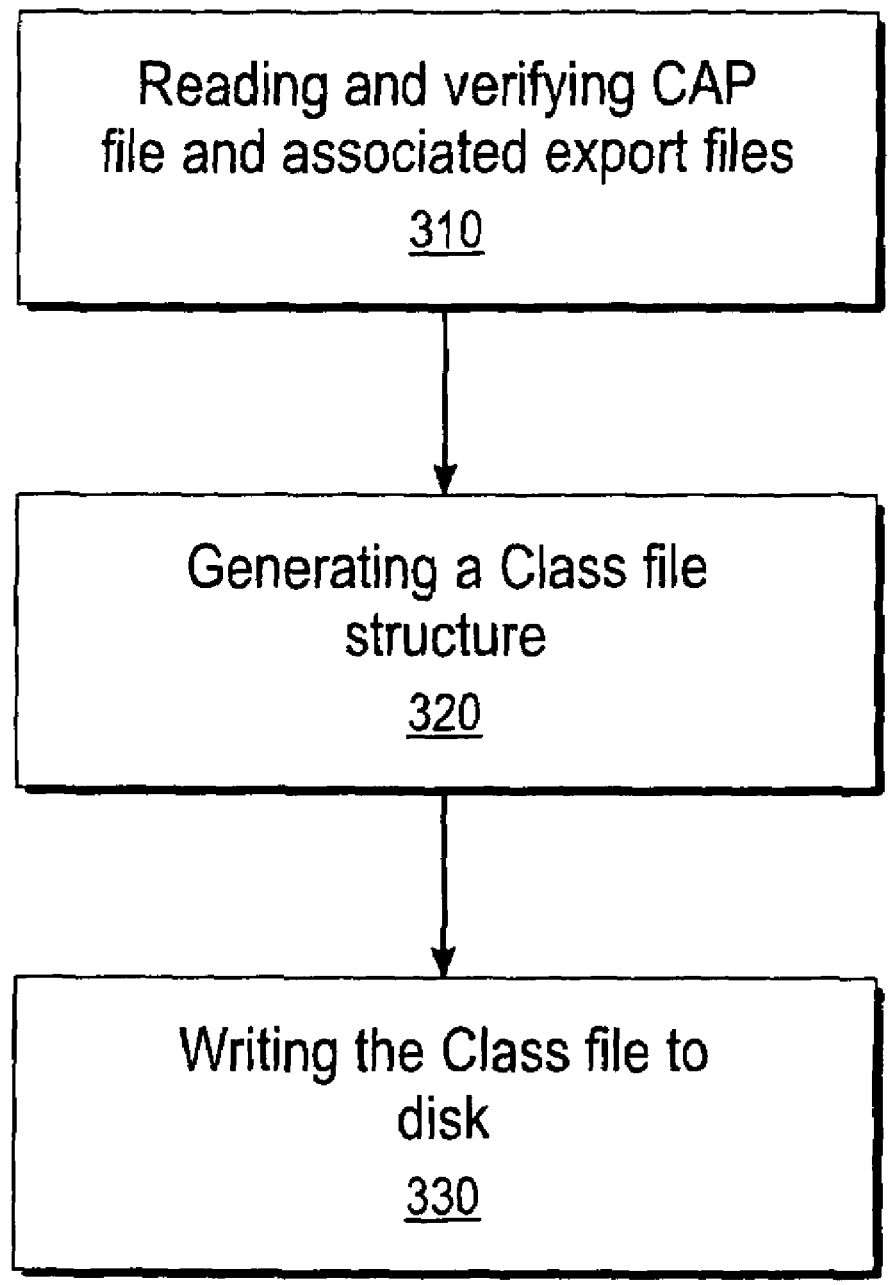
FIG. 3 is a flowchart illustrating procedure for converting a legacy application file into a next generation smart card application file, in accordance with an embodiment of the present invention.

To further break-down the process of converting a legacy application into a non-legacy application, consider the procedure illustrated in FIG. 3. It illustrates an example procedure 300 for converting a legacy application into a non-legacy application. The procedure involves three main steps: 1) reading and verifying the legacy application and associated files 310, 2) generating non-legacy files corresponding to the legacy application 320, and 3) writing the non-legacy files to disk so they can be tested 330.

1. Reading and Verifying a CAP File

At step 310, a normalizer tool, like the normalizer tool illustrated in FIG. 2, reads a legacy application, such as a CAP file, to verify its integrity. In one embodiment, an off-card tool can be used to perform this step. The step of verifying its integrity involves ensuring that the file is complete and does not contain errors or other inconsistencies (e.g., bad instructions or calls to invalid routines). If the legacy application is valid and complete, the application is then translated into its corresponding non-legacy application format.

2. Generating the Non-Legacy Files

At step 320, a normalizer tool, like the normalizer tool illustrated in FIG. 2, generates the corresponding non-legacy application files. For example, suppose the normalizer tool is used to convert a CAP file to corresponding Class file structures. In this example, those file structures include a separate files for separate Classes, and within each Class a section for constants, a table for defining various interfaces and routines in a Class, a field table that outlines the names of variables and fields in a Class, and a method table that identifies the separate methods within the CAP file. The normalizer tool analyzes the CAP file in order to identify each Class associated with a CAP file and the Class file structures originally associated with the Class file. Once each Class and its corresponding structures have been identified, then the normalizer tool (using predetermined offsets) converts the CAP file commands into corresponding Class file instructions and fills the appropriate information into the converted Class file. To aid in the conversion process, the normalizer tool may use a conversion table, such as conversion table 300 illustrated in FIG. 3, to map CAP file instructions to corresponding Class file instructions.

The normalizer tool is designed to know the order it should encounter instructions in a CAP file and in what order those commands should be placed in the corresponding Class file. In an embodiment, the original Class file structures and their order are defined by a descriptor component contained in the CAP files themselves (or, alternatively, one of their associated configuration file). The descriptor component can define an entire Class as well as its corresponding Class file structures. For example, the descriptor component may correctly outline the fact that a Class should list some basic Class identification information such as its major and minor version numbers. The descriptor component may also outline which constant pool entries for a Class may be generated, as well as, additional features such as access flag information, interface definitions, and other field data. Finally, the descriptor component can define where methods and attributes definitions fit within a Class.

In some embodiments, a specific descriptor component may not be available. In such cases, the normalizer tool may analyze the entirety of a CAP file at the outset to determine the structures it defines and then using that information develops the corresponding Class file.

It should be noted that, generally, the descriptor component acts as the starting point for getting the information necessary to build Class file(s) since it contains information about all of the Classes in a CAP file. However, even with a descriptor component, in one embodiment, the normalizer tool may perform several passes over the CAP file in order to extract information that defines Class file structures and then input information into those Class file structures.

For example, the process of building a Class file can require the normalizer tool to perform several analytical passes over the corresponding CAP file. In an embodiment, the first pass over the CAP file involves the normalizer tool analyzing the descriptor component to identify the basic components of a corresponding Class file and add basic information regarding the implemented interfaces, fields, methods, and attributes to a constant pool portion of the Class file. In subsequent passes over the CAP files, the normalizer tool can add additional information to the constants pool about other Classes being referenced, including interfaces, fields, methods associated with those other Classes. In one embodiment, after the CAP file and its associated files have been analyzed, a constants pool count is created to describe the number of entries in the constants pool. That information identifies the number of additional structures that need to be built in the Class. Moreover, the constants pool count can be an indicator to determine the offset for specific values and instructions to be inserted into the Class file.

In addition to creating the constants pool, during passes over the CAP and associated files, the normalizer tool may create additional placeholder type structures, such as an interfaces array and methods array, for the Class file. The type and number of these structures will vary based on the actual files being analyzed and implementation of the CAP files, Class files, and normalizer tool.

In one implementation, a placeholder structure (e.g., an array) is created for each general structure in a Class (e.g., an array is created for constants, flags, interfaces, methods, fields, attributes, etc.) These placeholder structures contain indexes for the interfaces, flags, fields, methods, and attributes, directly implemented in a Class. The reason for creating these placeholder structures is because, in a CAP file, it can be difficult to determine exactly which components are implemented directly by the Class being processed (e.g., a CAP file can contain information regarding the current Class and all of its super classes). So, these placeholders are meant to keep track of which interfaces belong to which Class.

Once all the individual structures have been identified (e.g., how many methods, flags, interfaces, etc. per Class), the normalizer tool performs additional passes over the CAP and associated files in order to fill out information for each identified structure. For example, the normalizer tool performs a pass over the CAP file in order to identify and extract information for each of the methods identified. Then, the normalizer tool converts those instructions into its corresponding Java® Class instruction and places the instruction in the associated method file structure.

It should be noted that during the conversion process, the normalizer tool may not find names for particular methods. In such cases, the method names (especially for private or package private methods) are generated automatically by the normalizer tool. If the name of a method can be found, the normalizer tool performs checks to verify the method name is not being used elsewhere (e.g., in a super-class), and names the method.

The result of this process is that the normalizer tool converts all the code into "converted code." Each instruction in a CAP and its associated file is evaluated and mapped to a corresponding Class file instruction.

Once the conversion process is complete, as noted above, there may be differences between an original Class file and the one generated by the normalizer tool (for example, some names, access flags, and attributes may be slightly different), but the files themselves should behave as functional equivalents.

In other implementations, a different set of components and structures may be used to parse and extract information from a legacy application.

3. Write and Test the Class File.

Once the Class file has been created, at step 330, the Class file is checked to ensure its validity. In one embodiment, the normalizer tool generates a JAR file that contains all the newly created non-legacy application files, as well as the legacy application files. The reason for storing both is so that the two sets of files can be compared on subsequent installations to ensure the data is complete and accurate. In an embodiment, other files and Classes, such as a proxy shareable interface object class, may be added to the JAR file in order to help the converted application execute in a next generation smart card framework. In addition, in an embodiment, the newly created files are tested, for example, by loading it using a Java class loader.

Once an executable file for the next generation smart card framework has been created for the legacy applications, tools and techniques recreate the specialized environment in which those applications executed.

C. The Legacy Application Environment

To ensure the safe execution of legacy applications in the next generation smart card framework, a specialized environment is created for the legacy applications. This specialized environment ensures that the legacy applications can execute as single-threaded applications.

To understand how to create the specialized environment for the legacy applications, additional information about the legacy smart card environment is provided herein. In the legacy smart card environment, when a legacy application is launched, the runtime environment (including the virtual machine) creates objects in which it stores and manipulates data. The objects created by the runtime environment are owned by the application that creates it. A firewall mechanism protects each legacy application from intermitted external access. Thus, a legacy application cannot access another application's objects or object methods unless they are explicitly shared.

1. Firewall

The firewall mechanism is a virtual machine runtime-enforced protection created for legacy smart card environments. For example, in a Java Card environment, the Java Card virtual machine ensures application isolation through its firewall mechanism. As a result, a legacy application can access resources within its own context, but not beyond it. The way the firewall controls access to an application is by assigning an object space, called a "context," to each application on the card when it is initially executed. The legacy smart card environment's firewall mechanism creates and manages each generated context. In a legacy environment only one context is active at any one time (e.g., because the legacy environment is single-threaded). When an external resource attempts to access a resource protected by a firewall, the firewall mechanism checks the call to determine if access should be allowed. Generally, when a call is made from within the same context, access to the called resource is allowed. On the other hand, calls made from an application or resource in a different context is generally prohibited by the firewall.

There are, however, a number of cases when applications from different contexts need to share data. Thus, when necessary, the legacy smart card environment provides secure ways of sharing data. In a Java Card environment, those mechanisms include: entry point objects (EPO), global arrays, and shareable interface objects (SIO).

Briefly, an EPO is a mechanism in Java Card that allows certain objects to be flagged (e.g., either by the virtual machine at runtime or by the developer) as entry point objects. Once flagged, those methods become accessible to any context.

Global arrays refer to specific data structures that by their nature are accessible in any context. For example, for applications to communicate, APDU messages are sent between applications. The APDU ("Application Data Unit") buffer holds those messages until they can be processed. In order for an application to send and receive those messages, the application has to have access to them. Accordingly, an APDU buffer is implemented as a global array that applications and resources from any context can access.

2. Shareable Interface Object

Although EPOs and global arrays are two of the mechanisms for sharing some data between applications, ultimately, in a Java Card environment, shareable interface objects ("SIO") are the mechanism for accessing another application's methods.

An SIO generally refers to an instance of a Class that implements a shareable interface. Through the shareable interface, an object can "export" its methods to other applications. Thus, if a developer wants certain methods in an application to be exported, those methods are declared in an interface that extends the tagging interface "javacard.framework.Shareable". This indicates to the Java Card runtime environment that these methods can be accessed from other contexts. When the defined interface is implemented in a Class and instantiated as an object of that Class, that newly created object is an SIO.

A requestor application that requires access to an object held by a receiving application sends a call to the receiving application, which determines whether it will share the requested object with the requestor application. In a Java Card embodiment, the requestor application may call the "JCSystem.getAppletShareableInterfaceObject ( )" method to access another application's object interface. Upon receiving the call, if the receiving application determines that it can grant access to requestor application, then the receiving application returns a reference (of type SIO) to the requested object.

The requestor application can then invoke methods using the SIO. For example, the requester application invokes an interface in the SIO to access the appropriate object or object method in the receiving application's context.

Thus, in Java Card, an application can only invoke methods from another application through the SIO mechanism. This prevents obvious hacks, such as casting an object reference to gain access to all of the public object methods, bypassing the restriction of the interface.

D. Recreating the Legacy Application Environment

Techniques are used during on-card execution to provide the specialized runtime requirements of legacy applications without imposing a significant performance penalty on other applications.

To recreate the specialized legacy application environment in a next generation smart card framework, mechanisms create fresh copies of objects that were previously shared. The reason why fresh copies are created of previously shared objects is to remove from the firewall the burden of monitoring references to shared objects and preventing an application from keeping non-local references to such objects.

1. Shared Objects

As noted before, legacy smart cards have very limited resources. As a result, in the legacy smart card environment, applications often share objects that are common to more than one application. For example, one of the more common objects used in legacy smart card environments is the APDU (Application Data Unit). An APDU buffer is used to facilitate the exchange of messages between applications. When APDUs are exchanged between applications, a lot of sensitive information is passed through APDUs. For instance, as part of the process of verifying a user's rights to a piece of digital media, as APDUs are sent back and forth from a media player to the smart card, one of the messages contains the user's password to access to the digital content.

Because of their size, in the legacy smart card environment, APDUs are often shared and/or reused. Sharing APDUs creates the potential for security leaks. For example, since APDUs can be shared and/or reused, it might be possible for one application to access information from another application stored in the APDU (because the APDU and the information in the APDU are common to both applications). Thus, an application could snoop for and capture confidential information meant for another application.

For example, by monitoring APDUs, a requesting application could find out the name of the responding application and monitor messages destined for the responding application. Accordingly, to prevent these types of security leaks, the legacy smart card environments granted exclusive access to the APDUs until an application terminated. Then, before granting access to other applications, the APDU buffers were cleared. Accordingly, legacy applications were developed with the expectation of having exclusive access to certain shared objects.

In next generation smart card frameworks, enforcing the legacy smart card restrictions imposes unnecessary performance penalties on non-legacy applications. For instance, suppose that a user is playing encrypted video. To decrypt the digital video signal, a smart card is used to verify the user's access rights. Decrypting the digital video signal involves processing a significant amount of data by the card. In a legacy smart card environment, video playback performance is significantly affected by the constraints imposed by its operating environment. By removing many of the legacy smart card constraints, next generation smart card frameworks improve playback performance.

For example, in FIG. 1, the next generation smart card framework 100 provides mechanisms for creating separate copies of objects that were previously shared in legacy smart card environments. In an embodiment, the new objects created for each application are not duplicates of existing objects, but are new objects created to work in conjunction with a particular application or thread.

According to an embodiment, virtual machine 102 creates the new copies of the previously shared objects.

In an embodiment, virtual machine 102 generates a new copy of shared objects in memory each time an application calls for one. Accordingly, in framework 100, previously shared objects are allowed to proliferate. For example, in one embodiment, a legacy applet 120 executing on virtual machine 102 receives an APDU from an external process. This APDU is encapsulated in an APDU object. Upon receiving the APDU object, in a legacy smart card environment, the legacy applet 120 responds using the same APDU object. The problem in the legacy smart card environment is that the next command processing cycle (e.g., the next application waiting to be executed) has to wait until after an APDU object is released until it can begin to be processed. In an embodiment of the next generation smart card framework, virtual machine 102 allocates one APDU object to encapsulate APDUs sent to and returned from legacy applets, but now a different APDU object may be used for the next command processing cycle.

Creating new copies of previously shared objects helps virtual machine 102 avoid the potential performance penalties that can occur when applications have access to the same object/resource (e.g. virtual machine 102 does not need to perform additional checking to flag bad object references stored by an application). In this way, the next generation smart card framework 100 creates an environment in which legacy applications can execute smoothly.

Furthermore, by creating new copies of previously shared objects, legacy application security concerns are minimized. In other words, each new object is created fresh, minimizing the amount of data in any one shared object. Thus, even if sensitive data is added to a shared object, the legacy application does not hold a reference to the shared object for very long. This means that even if another application has access to a previously shared object, the information in any one particular object becomes stale very quickly.

2. Proxy Object

In one embodiment, next generation smart card framework 100 provides a multi-threaded environment in which legacy applications can execute. However, to ensure execution safety and the integrity of non-thread aware applications in a multi-threaded environment, a proxy object is introduced to the next generation smart card framework 100. The proxy object acts as a surrogate to the legacy application's SIO. In addition, the proxy objects help prevent legacy applications from unnecessarily tying up resources and slowing down the performance of other applications.

Even in the next generation smart card framework, a legacy application assumes that it is the only active application at any given time. However, as discussed above, in a next generation smart card environment, that assumption may not be accurate. Other applications (non-legacy or legacy) can be running concurrently. To avoid potential conflicts, in an embodiment, framework 100 creates proxy objects that control access to the legacy application. Thus, to a legacy application, it appears as if it is the only application running.

For example, in the next generation smart card framework 100, messages sent to the legacy applications can be in the form of APDUs. A legacy application accepts and responds to those messages in a single-threaded manner. Thus, when a legacy application 120 receives an APDU, it expects to be able to process the entire request and respond back to the calling service before receiving any additional information.

At the same time, in framework 100, non-legacy applications, such as servlet-based applications 101 and extended applets 107, may be running concurrently, spawning new threads. For instance, when a servlet-based application 101 receives an HTTP message, it may respond with a message indicating that the message was received and is being processed. At the same time, the servlet-based application may start a separate thread to begin processing the call. Thus, multiple threads may be running at any given time in the framework 100. As a result, multiple simultaneous calls may be made of a legacy application.

To handle those calls, the legacy application's SIO, in one embodiment, is encapsulated by a proxy object. A proxy object generally refers to an object of type class "proxy." In one embodiment, there is a proxy object for every SIO.

According to one embodiment, the proxy type acts as an envelope around the SIO so that, when calls are received, the proxy object simply check to see if another thread is already executing the SIO's legacy application code. If so, the calling thread is suspended until the thread accessing the legacy application code terminates. In one embodiment, it performs these functions using Java thread synchronization primitives.

In other embodiments, a proxy class implements methods and interfaces that ensure that the SIO and legacy application code are accessed by one thread at a time. For example, in an embodiment, the proxy class includes methods and attributes to intercept and store messages intended for an SIO. Accordingly, the proxy class implements a list, queue, stack, or array with associated methods to store the messages intended for the SIO. In another embodiment, the proxy object performs call serialization in some other way to the SIO object. In addition, the proxy class also implements methods to control access to the SIO object. For example, the proxy class may include methods to instantiate the SIO, methods to destroy the SIO after all calls from a particular requesting application have completed, an invoke method to access the SIO's methods, synchronization methods that control how and when a requestor application is allowed to access the SIO, a priority method to determine the priority in which the receiving application should respond to calls, a polling method to determine if the legacy application is busy, error checking methods to verify that a call is valid, identification methods to verify the identify of the requestor application, a forwarding method that sends APDUs messages to the legacy application, a reply method that stores and forwards responses from the legacy application back to the requesting applications, and a variety of other methods that may be useful in controlling access to an SIO. Note that the above listed methods are example methods and, depending on implementation, may vary from one framework to another.

Other attempts to access legacy application code may be managed by an APDU dispatcher. The APDU dispatcher is a system component (or a component of the virtual machine) that receives APDU messages and, upon receiving an APDU message to be processed by legacy application code, checks to see whether another thread is already executing the legacy application code. In one embodiment, the APDU dispatcher performs this check via the same locking mechanism used for serializing calls to the legacy applet SIO. If the legacy application code is free, then the APDU dispatcher can grant access to the legacy application code.

In an embodiment, access to a legacy application is controlled by using an execution context lock or a global container lock. In other words, the proxy object can use synchronization mechanisms, such as those found in Java, to ensure only one application has access to the legacy application at a given time.

According to one embodiment, the next generation smart card framework 100 automatically detects when a legacy application is invoked. In one embodiment, a normalizer tool inserts tags into the code to indicate that an application is a legacy application. Thus, when the legacy application's SIO is invoked, framework 100 checks for the tag indicating a legacy application and instantiates a proxy object for the legacy application's SIO. Then all calls to the legacy application's SIO are intercepted by the proxy object and serialized before invoking the original SIO's methods. In alternative embodiments, the legacy application can be determined in some other way (e.g., by checking a major minor version of a Class, maintaining a registry or list that identifies which applications are legacy applications, etc).

In one embodiment, applet API 110 creates the proxy object for a legacy application. Alternatively, virtual machine 102 automatically instantiates the proxy object when a legacy application is invoked.

3. Example of Creating a Proxy Object

Referring again to framework 100, suppose a non-legacy application calls information from a legacy application. In one embodiment, framework 100 intercepts the call and detects that the call is being sent to the legacy application. Accordingly, in one embodiment, framework 100 launches the legacy application and instantiates a proxy object for the legacy application's SIO. In one embodiment, the SIO is also instantiated at this time. In addition, framework 100 creates an entry in its applications list to redirect any messages sent to the legacy application to the proxy object.

Once the proxy object has been instantiated, the original message intended for the legacy application is forwarded to the proxy object. In one embodiment, the message is serialized and processed. When the message is finally processed by the proxy object, in one embodiment, the proxy object invokes the appropriate method and/or called data called through the legacy application SIO.

Once the call has been answered, in one embodiment, the legacy application sends the response to the proxy object which then forwards the response to the requesting application. By sending the response through the proxy object, the proxy object can track when the legacy application becomes available. Moreover, the proxy object can ensure a certain level of performance. Alternatively, the legacy application responds directly to the requesting application.

Suppose that during the interval that the legacy application is creating a response to the first received message, several other calls from other applications are simultaneously sent to the legacy application. In one embodiment, those messages are redirected to the proxy object, which serializes them. Then, each time the legacy application completes a response to a message, the proxy object processes the next message. In this way, the proxy object prevents the SIO from dropping incoming messages.

Basically, the proxy object intercedes when a call comes in from a source external to the legacy application. When the SIO is in use, the proxy object holds up other calls until the SIO is released. Then the proxy object calls the requested information through the SIO. Accordingly, requesting applications can communicate with legacy applications.

With reference to FIG. 1, suppose legacy applet 120 is executing in framework 100. Accordingly, framework 100 has generated a proxy object for legacy applet's SIO. Thus, when a servlet-based application 101 calls data from the legacy applet, in an embodiment, virtual machine 102 detects the call sent from servlet-based application 101 to legacy applet 120. The call is redirected to the proxy object, which then forwards the call through the SIO to legacy applet 120. Then, legacy applet 120 processes the call.

Now, suppose that before legacy applet has completed processing the call from servlet-based application 101, extended applet 107 also sends a call to legacy applet 120. In an embodiment, the call from the extended applet 107 is intercepted by the proxy object and held until legacy applet 120 has finished processing the call from servlet-based application 101 and released its resources. Similarly, if other calls are made of legacy applet 120, those calls are intercepted and held by the proxy object until the calls can be serviced.

In this way, legacy applet 120 can continue to function without being compromised by other applications. It should also be noted, that the proxy object should not create much of a performance penalty. Only applications attempting to access a legacy application are directly affected. Other processes and applications continue executing around the legacy application.

E. Procedure for Creating Specialized Environment

Figure 4:
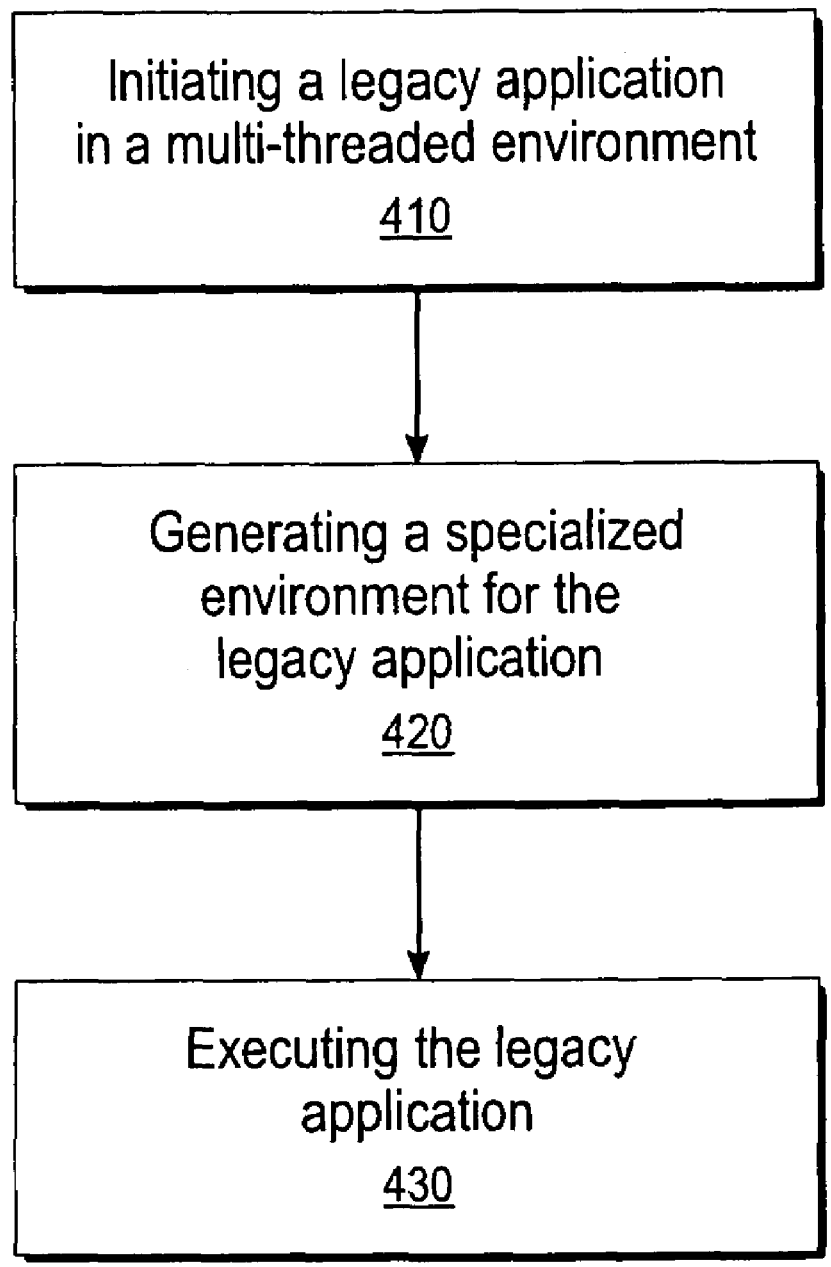
FIG. 4 is a flowchart illustrating procedure for generating a specialized environment for executing a legacy application in a next generation smart card environment, in accordance with another embodiment of the present invention.

FIG. 4 illustrates an example procedure for creating the specialized environment in which legacy applications execute in a next generation smart card framework. To illustrate this process, assume that a number of applications are already executing on a next generation smart card virtual machine (e.g., the virtual machine 102 described in connection with FIG. 1). At step 410, a user opens a legacy application in the next generation smart card environment. In one embodiment, when the user opens the legacy application the next generation smart card framework detects that the application is a legacy application and requires a specialized environment for it to execute safely.

Accordingly, at step 420, a specialized environment is created for the legacy application. In one embodiment, the next generation smart card virtual machine creates and manages the specialized environment. As described above, a legacy application is usually only accessible to other applications through an SIO. Since the next generation smart card environment allows multiple applications to execute concurrently, the legacy application may receive numerous calls at a time (even though its SIO may only be designed to handle one call at a time). As a result, in one embodiment, a proxy object is created to encapsulate the SIO. By doing so, access to the SIO can be controlled. Basically, the proxy object intercepts calls and forwards them to the legacy application (through the SIO) as each previous call is completed. Thus, only one call (or however many calls the SIO is capable of handling) is allowed to access the shareable interface at a time.

In one embodiment, the next generation smart card's virtual machine may also further enhance the specialized environment by creating copies of objects that were intended by the single-threaded application to be shared. It does so by detecting when the legacy application is accessing an object in memory that, in the legacy smart card environment, is intended to be shared. When the next generation smart card framework detects the object, it simply creates a new copy of the object in memory. Thus, the object is no longer a shared object.

At step 430, once the specialized environment has been created, the legacy application can execute safely.

Hardware Overview

Figure 5:
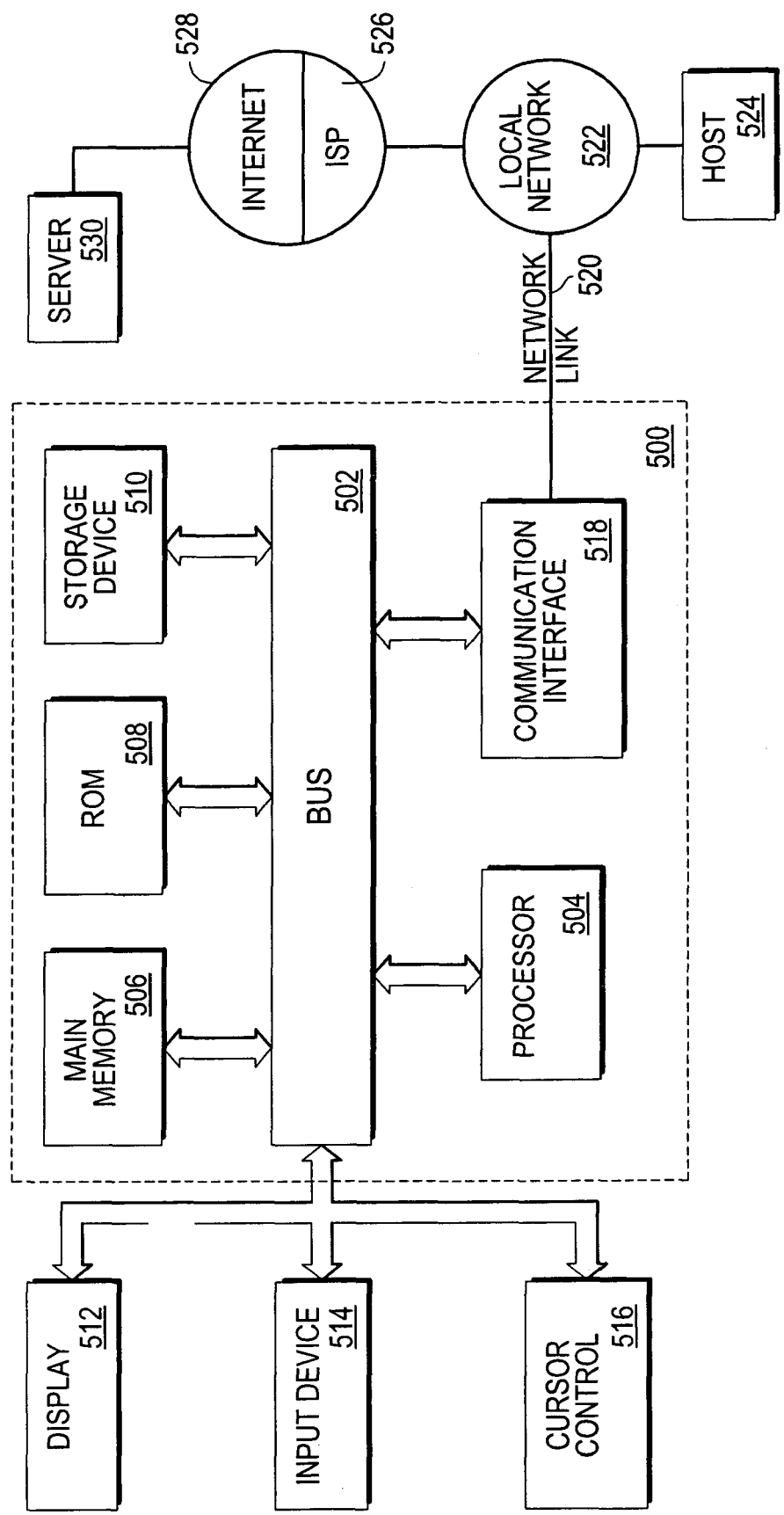
FIG. 5 is a block diagram that illustrates a computer system upon which an embodiment in accordance with the present invention may be implemented.

FIG. 5 is a block diagram that illustrates a computer system 500 and smart card upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for the tools and techniques described herein. According to one embodiment of the invention, tools and techniques are provided by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 504 for execution. Such a medium may take many forms, including but not limited to, nonvolatile media, and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge or any other medium from which a computer can read.

For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for techniques as described herein.

The received code may be executed by processor 504 as it is received, and/or stored in storage device 510, or other non-volatile storage for later execution. In this manner, computer system 500 may obtain application code in the form of a carrier wave.

We claim:

1. A method for supporting a legacy application in a multi-threaded runtime environment comprising:
   executing a plurality of multi-threaded applications in the multi-threaded runtime environment on a smart card;
   detecting a request to open the legacy application on the smart card,
      wherein the legacy application is a single-threaded application designed to run in a single-threaded environment, and
      wherein the legacy application is accessible to the plurality of multi-threaded applications through a shareable interface object;
   generating, in response to the request and in the multi-threaded runtime environment, a specialized environment for the legacy application to execute,
      wherein the specialized environment is configured to execute the legacy application, and
      wherein the specialized environment comprises a proxy object, wherein the proxy object encapsulates the shareable interface object to control access by the plurality of multi-threaded applications to the shareable interface object such that only one multi-threaded application is allowed to access code in the legacy application at a time; and
   executing the legacy application in the specialized environment on the smart card, wherein during execution of the legacy application:
      detecting that the legacy application is accessing an existing instantiation of an object in memory, wherein the existing instantiation of the object is intended by the legacy application to be shared between applications executing in the single-threaded environment; and
      creating, in response to the detecting that the legacy application is accessing the existing instantiation of the object, a new copy of the object in memory to cause the existing instantiation of the object to not be shared.

2. The method of claim 1, wherein the plurality of multi-threaded applications are running concurrently with the legacy application.

3. The method of claim 1, wherein the shareable interface object is designed to handle only one call at a time.

4. The method of claim 1, wherein the proxy object intercepts a call to access the shareable interface object.

5. The method of claim 1, wherein the proxy object holds other calls until the shareable interface object completes executing a current call.

6. The method of claim 1, further comprising:
converting the legacy application from a compressed format into a non-compressed format before executing the legacy application in the multi-threaded runtime environment.

7. The method of claim 6, wherein the compressed format is a CAP file format and the non-compressed format is a Class file format.

8. The method of claim 1, wherein allowing only one multi-threaded application to access the shareable interface at a time includes serializing the calls to the legacy application.

9. A non-transitory machine-readable storage medium comprising a set of instructions for performing a method for supporting a legacy application in a multi-threaded runtime environment, the method comprising:
executing a plurality of multi-threaded applications in the multi-threaded runtime environment on a smart card;
detecting a request to open the legacy application on the smart card,
wherein the legacy application is a single-threaded application designed to run in a single-threaded environment, and
wherein the legacy application is accessible to the plurality of multi-threaded applications through a shareable interface object;
generating, in response to the request and in the multi-threaded runtime environment, a specialized environment for the legacy application to execute,
wherein the specialized environment is configured to execute the legacy application, and
wherein the specialized environment comprises a proxy object, wherein the proxy object encapsulates the shareable interface object to control access by the plurality of multi-threaded applications to the shareable interface object such that only one multi-threaded application is allowed to access code in the legacy application at a time; and
executing the legacy application in the specialized environment on the smart card, wherein during execution of the legacy application:
detecting that the legacy application is accessing an existing instantiation of an object in memory, wherein the existing instantiation of the object is intended by the legacy application to be shared between applications executing in the single-threaded environment; and
creating, in response to the detecting that the legacy application is accessing the existing instantiation of the object, a new copy of the object in memory to cause the existing instantiation of the object to not be shared.

10. The non-transitory machine-readable storage medium of claim 9, wherein the plurality of multi-threaded applications are running concurrently with the legacy application.

11. The non-transitory machine-readable storage medium of claim 9, wherein the shareable interface object is designed to handle only one call at a time.

12. The non-transitory machine-readable storage medium of claim 9, wherein the proxy object intercepts a call to access the shareable interface object.

13. The non-transitory machine-readable storage medium of claim 12, wherein the proxy object holds other calls until the shareable interface object completes executing a current call.

14. The non-transitory machine-readable storage medium of claim 9, further comprising converting the legacy application from a compressed format into a non-compressed format before executing the legacy application in the multi-threaded runtime environment.

15. The non-transitory machine-readable storage medium of claim 14, wherein the compressed format is a CAP file format and the non-compressed format is a Class file format.

16. The non-transitory machine-readable storage medium of claim 9, wherein allowing only one multi-threaded application to access the shareable interface at a time includes serializing the calls to the legacy application.

* * * * *